(12) United States Patent
Dobrinsky et al.

(10) Patent No.: US 9,703,055 B2
(45) Date of Patent: Jul. 11, 2017

(54) AAO-BASED LIGHT GUIDING STRUCTURE AND FABRICATION THEREOF

(71) Applicant: Sensor Electronic Technology, Inc., Columbia, SC (US)

(72) Inventors: Alexander Dobrinsky, Loudonville, NY (US); Michael Shur, Latham, NY (US); Remigijus Gaska, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 0 days.

(21) Appl. No.: 14/853,014

(22) Filed: Sep. 14, 2015

(65) Prior Publication Data

US 2016/0077292 A1    Mar. 17, 2016

Related U.S. Application Data

(60) Provisional application No. 62/050,126, filed on Sep. 13, 2014, provisional application No. 62/050,127, filed on Sep. 13, 2014.

(51) Int. Cl.
*G02B 6/42* (2006.01)
*G02B 6/10* (2006.01)
(Continued)

(52) U.S. Cl.
CPC .......... *G02B 6/4239* (2013.01); *G02B 6/102* (2013.01); *G02B 6/1225* (2013.01); *G02B 6/136* (2013.01); *G02B 6/0096* (2013.01); *G02B 6/34* (2013.01); *G02B 6/4204* (2013.01); *G02B 2006/12035* (2013.01); *G02B 2006/12104* (2013.01)

(58) Field of Classification Search
CPC .... G02B 6/4239; G02B 6/102; G02B 6/1225; G02B 6/136; G02B 6/0096; G02B 6/34; G02B 6/4204; G02B 2006/12035; G02B 2006/12104
See application file for complete search history.

(56) References Cited

U.S. PATENT DOCUMENTS 4,045,119 A     8/1977   Eastgate
5,675,689 A    10/1997   Nath
(Continued)

FOREIGN PATENT DOCUMENTS

WO       2005011753 A1    2/2005

OTHER PUBLICATIONS

Kang, S. International Application No. US2015/049917, International Search Report and Written Opinion, Dec. 23, 2015, 13 pages.
(Continued)

*Primary Examiner* — John M Bedtelyon
(74) *Attorney, Agent, or Firm* — Labatt, LLC

(57) ABSTRACT

A light guiding structure is provided. The structure includes an anodized aluminum oxide (AAO) layer and a fluoropolymer layer located immediately adjacent to a surface of the AAO layer. Light propagates through the AAO layer in a direction substantially parallel to the fluoropolymer layer. An optoelectronic device can be coupled to a surface of the AAO layer, and emit/sense light propagating through the AAO layer. Solutions for fabricating the light guiding structure are also described.

20 Claims, 8 Drawing Sheets

(51) Int. Cl.
 *G02B 6/122* (2006.01)
 *G02B 6/136* (2006.01)
 *G02B 6/34* (2006.01)
 *G02B 6/12* (2006.01)
 *F21V 8/00* (2006.01)

(56) References Cited

U.S. PATENT DOCUMENTS

| | | | |
|---|---|---|---|
| 6,163,641 | A | 12/2000 | Eastgate |
| 6,314,227 | B1 | 11/2001 | Nath |
| 6,418,257 | B1 | 7/2002 | Nath |
| 6,476,409 | B2 * | 11/2002 | Iwasaki ............... B82Y 10/00 257/13 |
| 6,773,584 | B2 | 8/2004 | Saccomanno |
| 6,863,428 | B2 | 3/2005 | Lundin |
| 6,936,854 | B2 * | 8/2005 | Iwasaki ............... B82Y 20/00 257/433 |
| 7,016,566 | B2 | 3/2006 | Dimas et al. |
| 7,211,763 | B2 | 5/2007 | Zhang |
| 7,613,378 | B2 | 11/2009 | Girardon et al. |
| 7,660,509 | B2 * | 2/2010 | Bryan ............... G02B 6/0028 349/65 |
| 7,914,852 | B2 | 3/2011 | Belz et al. |
| 7,960,706 | B2 | 6/2011 | Ullman |
| 8,177,383 | B2 | 5/2012 | Reuben |
| 8,434,909 | B2 * | 5/2013 | Nichol ............... G02B 6/0018 362/296.01 |
| 8,442,602 | B2 | 5/2013 | Wong et al. |
| 2003/0044149 | A1 | 3/2003 | Fraval et al. |
| 2004/0036560 | A1 | 2/2004 | Higuchi et al. |
| 2006/0002675 | A1 | 1/2006 | Choi et al. |
| 2009/0034236 | A1 | 2/2009 | Reuben |
| 2010/0014027 | A1 | 1/2010 | Li et al. |
| 2010/0165621 | A1 | 7/2010 | Hoffend, Jr. et al. |
| 2011/0149201 | A1 | 6/2011 | Powell et al. |
| 2011/0273906 | A1 | 11/2011 | Nichol et al. |
| 2011/0286222 | A1 | 11/2011 | Coleman |
| 2011/0309032 | A1 | 12/2011 | Maki |
| 2013/0106918 | A1 | 5/2013 | Bita et al. |
| 2013/0336839 | A1 | 12/2013 | Gil et al. |
| 2014/0001374 | A1 | 1/2014 | Ullman |
| 2014/0071142 | A1 | 3/2014 | Steyn |
| 2014/0373606 | A1 | 12/2014 | Kraiczek et al. |
| 2015/0069265 | A1 | 3/2015 | Smetona et al. |
| 2015/0091043 | A1 | 4/2015 | Shur et al. |
| 2015/0360606 | A1 | 12/2015 | Thompson et al. |

OTHER PUBLICATIONS

International Application No. US2015/049922, International Search Report and Written Opinion, Mar. 18, 2016, 14 pages.
Agilent Technologies, "Light Guide Techniques Using LED Lamps, Application Brief I-003," 2001, 22 pages.
Dupont, "Amorphous Fluoroplastic Resin," www.teflon.com/industrial, 2013, 4 pages.
Gore® Diffuse Reflector Product, printed from http://www.gore.com/en_xx/products/electronic/specialty/specialty.html?RDCT=gore.com on Sep. 5, 2014.
Joo, B., et al., "Design guidance of backlight optic for improvement of the brightness in the conventional edge-lit LCD backlight," 2010, 6 pages.
Li, C., et al., "Prism-pattern design of an LCD light guide plate using a neural-network optical model," 2010, 5 pages.
Yang, M., et al., "Optical properties of Teflon AF amorphous fluoropolymers," Jul.-Sep. 2008, 9 pages.
Colombe, Y., et al., "Single-mode optical fiber for high-power, low-loss UV transmission," Optics Express, Aug. 2014, p. 19783, vol. 22, No. 16.
Fevrier, S., et al., "Ultraviolet guiding hollow-core photonic crystal fiber," 2009, 2888-2890, Opt. Lett.34(19)X.
Gebert, F., et al., "Damage-free single-mode transmission of deep-UV light in hollow-core PCF," Optics Express, Jun. 2014, p. 15388, vol. 22, No. 13.
Gonschior, C. P., et al. "Characterization of UV single-mode and low-mode fibers," 2010, Proc. of SPIE vol. 7559 75590X-1.
Yamamoto, N., "Single-mode delivery of 250 nm light using a large mode area photonic crystal fiber," 2009, p. 16933-16940, Opt. Express17(19).
Deo, D., U.S. Appl. No. 14/853,057, Office Action1, Jul. 21, 2016, 21 pages.
Ippolito, U.S. Appl. No. 14/853,036, Office Action1, Sep. 14, 2016, 15 pages.
Deo, D., U.S. Appl. No. 14/853,057, Notice of Allowance, Dec. 28, 2016, 15 pages.
Ippolito, U.S. Appl. No. 14/853,036, Notice of Allowance, Jan. 23, 2017, 18 pages.
Martin, et al., "Ordered arrays of polymeric nanopores by using inverse nanostructured PTFE surfaces," 2012, 10 pages, IOP Publishing.
Deo, D., U.S. Appl. No. 14/853,057, Notice of Allowance, Mar. 1, 2017, 9 pages.
Ippolito, U.S. Appl. No. 14/853,036, Notice of Allowance, Mar. 1, 2017, 13 pages.

\* cited by examiner

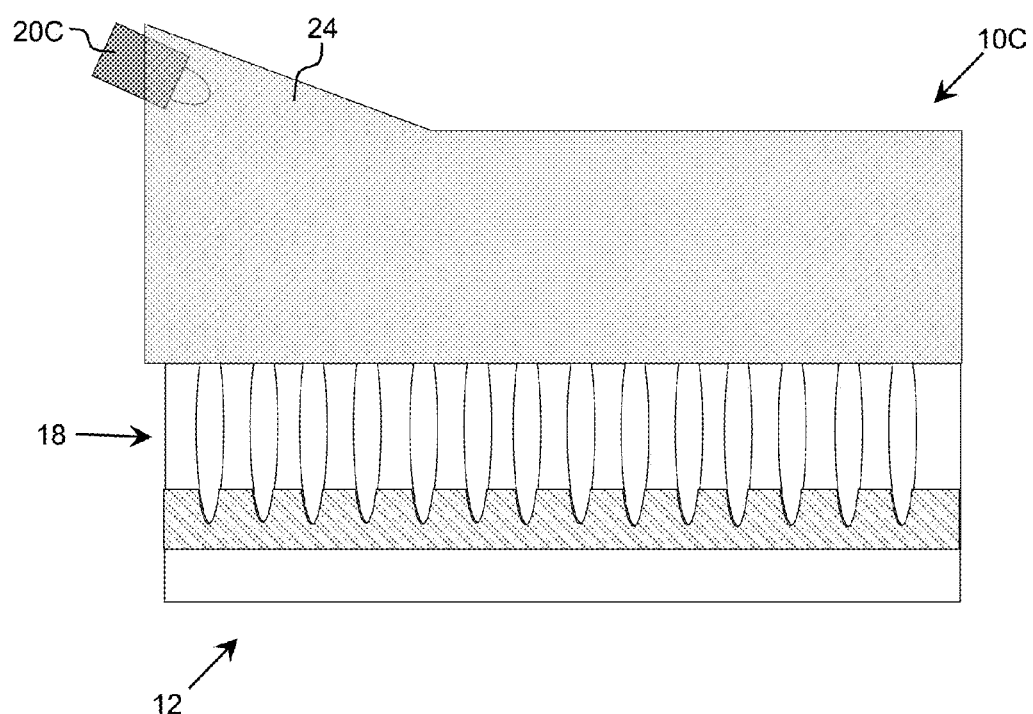

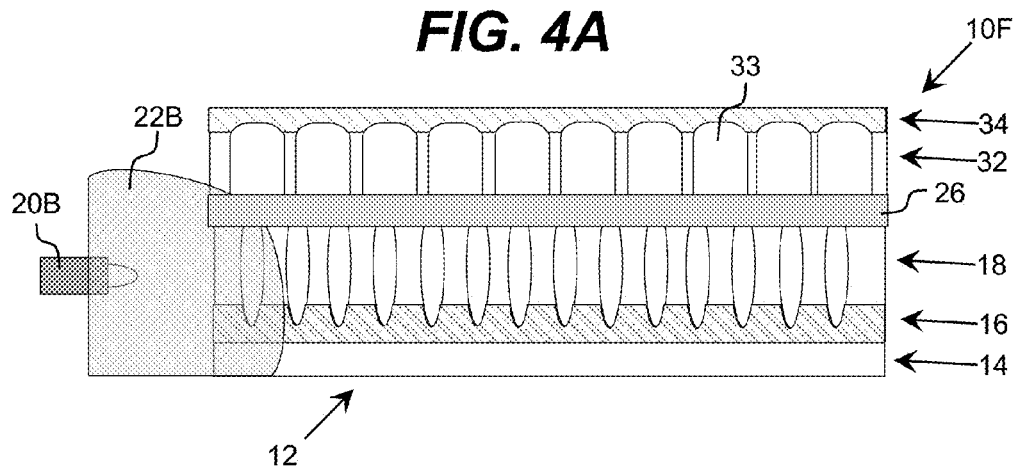
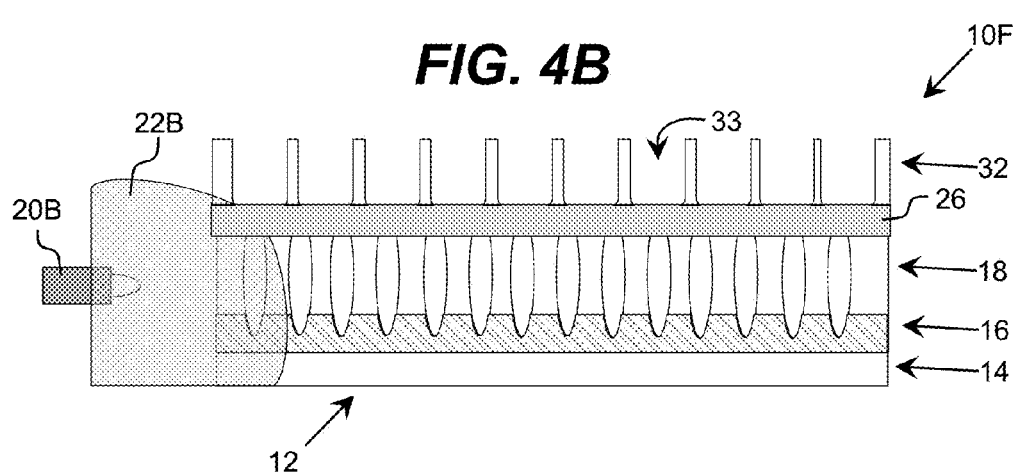
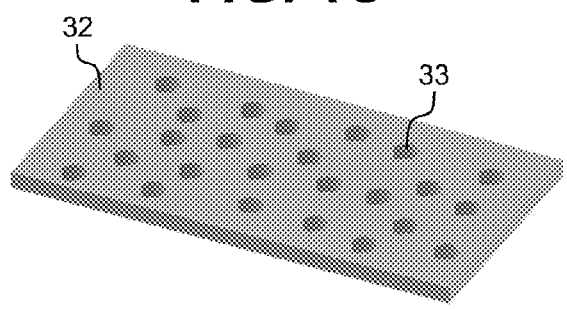

AAO-BASED LIGHT GUIDING STRUCTURE AND FABRICATION THEREOF

REFERENCE TO RELATED APPLICATIONS

The current application claims the benefit of U.S. Provisional Application No. 62/050,126 and U.S. Provisional Application No. 62/050,127, both of which were filed on 13 Sep. 2014, and both of which are hereby incorporated by reference.

TECHNICAL FIELD

The disclosure relates generally to light guiding structures, and more particularly, to fabrication of a light guiding structure including an anodized aluminum oxide (AAO) layer.

BACKGROUND ART

Compact diodes emitting in the ultraviolet (UV) domain recently have matured to be used in industrial, engineering, scientific, and medical applications. These light sources are used for disinfection, polymer curing, and skin illness treatment. In phototherapy, detrimental side effects can be minimized by carrying light through fiber optics so that a small output beam can be targeted at selected areas of the infected skin. Other applications of UV radiation include coherent anti-Stokes Raman scattering and fluorescence imaging.

A commonly utilized transparent material for guiding UV light includes solid-core fibers fabricated based on fused silica. In addition, the use of hollow-core photonic crystal fiber (HC-PCF) allowing weak interaction between the glass material and the light may assist in overcoming some drawbacks presented in solid-core fused silica fibers. For example, in the infrared (IR) region of the electromagnetic spectrum, HC-PCFs have been shown to guide light with loss thirty times lower than that of its glassy constituent. To this extent, an HC-PCF-based design for efficient propagation of UV light at wavelengths of 355 nm has been suggested.

A group considered using photonic crystal fibers (PCFs) for single-mode delivery of UV wavelengths in the range ~200-300 nm. Typical PCFs have a uniform patterned microstructure of holes (defects) running axially along the fiber channel with a missing hole in the center providing a core region. In an equivalent index-of-refraction picture, the microstructure imposes a strong wavelength dependence on the index-of-refraction of the cladding, and for high light frequencies (short wavelengths) the cladding index approaches the core index. With appropriate fiber design, the fiber core can support a single guided mode over all optical frequencies, a characteristic referred to as endless single-mode operation.

Similarly, a group studied single-mode optical fiber use in high-power, low-loss UV transmission. The group reported large-mode-area solid-core photonic crystal fibers made from fused silica that resist ultraviolet (UV) solarization even at relatively high optical powers. Using a process of hydrogen loading and UV irradiation of the fibers, the group demonstrated stable single-mode transmission over hundreds of hours for fiber output powers of 10 mW at 280 nm and 125 mW at 313 nm (limited only by the available laser power). Fiber attenuation ranges from 0.9 dB/m to 0.13 dB/m at these wavelengths, and was unaffected by bending for radii above 50 mm.

Liquid core waveguide or light guiding structures can be beneficial for guiding ultraviolet (UV) radiation, e.g., due to the low UV absorbance properties of some liquids, such as purified water. The general availability of water allows for the fabrication of relatively inexpensive light guides for UV radiation that can be readily adopted for use in industry. Combined with a light guide enclosure formed of a fluoropolymer having low UV absorbance and other beneficial properties (e.g., chemical inertness, low biological contamination), the benefits of thin light guiding UV layers can be easily appreciated.

These light guiding structures, or so-called liquid core waveguides or flow cells, have been developed for optical spectroscopy applications in the ultraviolet, visible, and infrared regions of the light spectra. Such flow cells are particularly suitable when combined with optical fibers for light transfer, enabling the design of a flexible sensor system. A number of flow cells having a long optical path length have been designed for absorbance, fluorescence, and Raman spectroscopy. Similar to optical fibers, light is confined in such flow cells within the (liquid) core by total internal reflection (TIR) at the liquid core/wall interface or the liquid core/cladding (coating) interface. The only requirement is that the liquid core refractive index be higher than that of the refractive index of the ambient. For liquid core comprising purified water, and for ambient being air, this requirement is easily satisfied.

One approach to employ liquid-based light guiding structures describes a reactor configuration for UV treatment of water utilizing TIR and a flow tube. The inlet and core of the cylindrical tank reactor unit is a transparent flow tube that is surrounded by a sealed, concentric volume of material having a lower refractive index than the fluid flowing in the flow tube, which enables TIR of UV light when it is directed axially into the flow tube. Another approach discloses a method and reactor for in-line treatment of fluids and gases by light radiation comprising a tube or a vessel made of transparent material, preferably quartz glass, and surrounded by air, and having a fluid inlet, a fluid outlet, and at least one opening or window adapted for the transmission of light from an external light source into the tube. Air outside the tube or vessel has a lower refractive index compared to the treated fluid, which enables TIR. Still other approaches discuss various aspects of a liquid core light guide. One such approach discusses a liquid core waveguide photon energy material processing system.

SUMMARY OF THE INVENTION

Aspects of the invention provide a light guiding structure. The structure includes an anodized aluminum oxide (AAO) layer and a fluoropolymer layer located immediately adjacent to a surface of the AAO layer. Light propagates through the AAO layer in a direction substantially parallel to the fluoropolymer layer. An optoelectronic device can be coupled to a surface of the AAO layer, and emit/sense light propagating through the AAO layer. Solutions for fabricating the light guiding structure are also described.

A first aspect of the invention provides a structure including: an anodized aluminum oxide (AAO) layer; and an optoelectronic device coupled to a side of the AAO layer, wherein the optoelectronic device is positioned at a target angle with respect to light propagating through the AAO layer.

A second aspect of the invention provides a light guiding structure comprising: an anodized aluminum oxide (AAO) layer; and a fluoropolymer layer located immediately adjacent to a surface of the AAO layer, wherein light propagates through the AAO layer in a direction substantially parallel to the fluoropolymer layer.

A third aspect of the invention provides a method comprising: fabricating a structure including: an anodized aluminum oxide (AAO) layer; and a fluoropolymer layer located immediately adjacent to a surface of the AAO layer, wherein light propagates through the AAO layer in a direction substantially parallel to the fluoropolymer layer.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 shows an illustrative light guiding structure according to another embodiment.

FIGS. 4A-4C illustrate fabrication of an illustrative light guiding structure according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a light guiding structure. The structure includes an anodized aluminum oxide (AAO) layer and a fluoropolymer layer located immediately adjacent to a surface of the AAO layer. Light propagates through the AAO layer in a direction substantially parallel to the fluoropolymer layer. An optoelectronic device can be coupled to a surface of the AAO layer, and emit/sense light propagating through the AAO layer. Solutions for fabricating the light guiding structure are also described. Embodiments of the light guiding structure can have thicknesses (as measured in a direction transverse to the propagation of light there through) of several micrometers.

Aspects of the invention can provide a method of fabricating a light guiding structure that can be thin (e.g., can be on the order of few microns, or even on the order of hundreds of nanometers) and can be easily utilized in small thin devices. An embodiment further provides a light guiding structure having a thickness on the order of few microns, or even on the order of hundreds of nanometers. Another embodiment provides a device, which includes a light guiding structure described herein.

As used herein, unless otherwise noted, the term "set" means one or more (i.e., at least one) and the phrase "any solution" means any now known or later developed solution. As also used herein, a layer is a transparent layer when the layer allows at least ten percent of radiation having a target wavelength, which is radiated at a normal incidence to an interface of the layer, to pass there through. A layer is highly transparent when the layer allows at least thirty percent of the radiation to pass there through, and a layer is substantially transparent when the layer allows at least eighty percent of the radiation to pass there through. Furthermore, as used herein, a layer is a reflective layer when the layer reflects at least ten percent of radiation having a target wavelength, which is radiated at a normal incidence to an interface of the layer and is highly reflective when the layer reflects at least eighty percent of the radiation. It is understood that a layer can be both transparent and reflective. In an embodiment, the target wavelength of the radiation corresponds to a wavelength of radiation emitted or sensed (e.g., peak wavelength +/- five nanometers) by an active region of an optoelectronic device during operation of the device. For a given layer, the wavelength can be measured in a material of consideration and can depend on a refractive index of the material. It is understood that, unless otherwise specified, each value is approximate and each range of values included herein is inclusive of the end values defining the range.

Figure 1A:
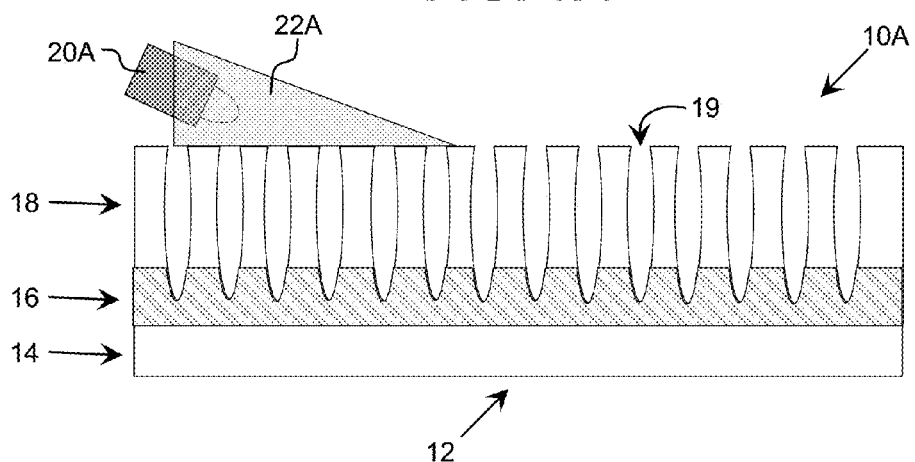
FIGS. 1A and 1B show illustrative light guiding structures according to embodiments.
Figure 1B:
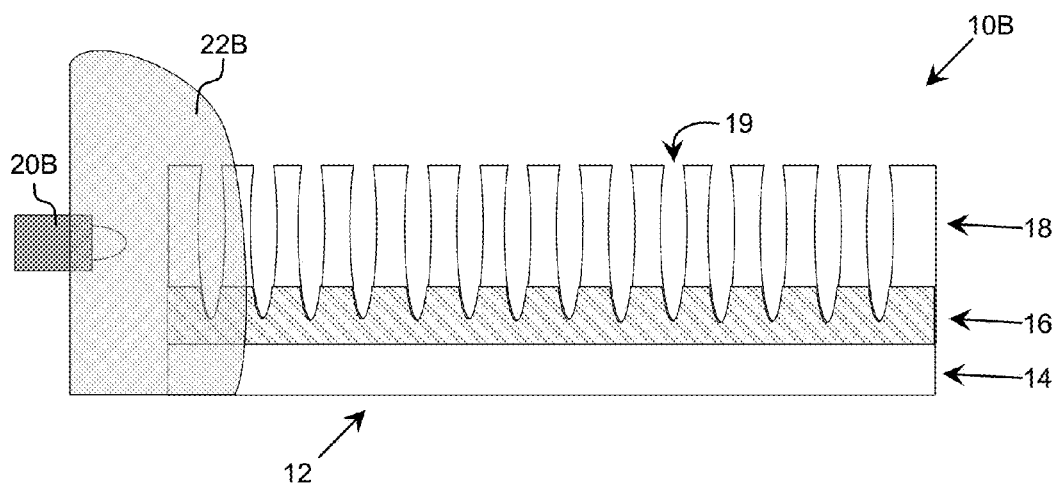

Turning to the drawings, FIGS. 1A and 1B show illustrative light guiding structures 10A, 10B according to embodiments. As illustrated, each light guiding structure 10A, 10B includes a multi-layer structure 12 including a substrate 14, an aluminum layer 16, and an anodized aluminum oxide (AAO) layer 18. The substrate 14 can comprise any suitable substrate for forming an AAO layer 18 thereon. The substrate 14 can be formed of any solid material capable of supporting an aluminum layer 16 thereon. For formation of the AAO layer 18, the aluminum layer can be accessible to an electrode. The multi-layer structure 12 can be fabricated using any solution. For example, fabrication can include depositing a layer substantially consisting of aluminum (e.g., having a thickness of the layers 16, 18) and performing an anodizing treatment to the aluminum layer (e.g., by causing the aluminum layer to oxidize), thereby forming the AAO layer 18 including a plurality of pores 19 and a remaining aluminum layer 16 through which the pores 19 do not extend.

Formation of the AAO layer 18 includes forming the plurality of pores 19 within the AAO layer 18 during an anodizing treatment. In an embodiment, at least some of the pores 19 extend through the AAO layer 18 and partially into the aluminum layer 16. In a more particular embodiment, substantially all of the pores 19 extend through the AAO layer 18. The attributes of the pores 19, including a characteristic size of the pores 19 (e.g., average diameter), a maximum depth of the pores 19, a density of the pores 19, and/or the like, can vary depending on a particular anodization procedure utilized. For example, an electrolyte (e.g., oxalic acid, phosphoric acid, sulfuric acid, malonic acid, and/or the like) and a corresponding concentration of the electrolyte can be selected based on a planned pore size. Subsequently, the AAO layer 18 can be formed by placing an aluminum film into the selected electrolyte having the corresponding concentration, and applying a voltage potential in a range of approximately 35 Volts to approximately 45 Volts for a time period in the range of several hours.

The anodization procedure can be followed by etching the anodized aluminum oxide. For example, such etching can comprise chemical etching including: etching in chromic acid and phosphoric acid while a temperature is in the range of 65-80° C. The phosphoric acid can be in the range of 6 wt to 7 wt % and the chromic acid can be in the range of 2 wt % to 3 wt %.

Furthermore, a second anodization can be performed by repeating a process substantially similar to or identical to the first anodization. In this case, hexagonally arranged nanoporous structures can be formed with one end blocked by the underlying substrate 14 and/or a remaining portion of the aluminum layer 16. A process time for the second anodization can be selected based on a target membrane thickness, and can range, for example, from one hour to forty-eight hours depending on the desired membrane thickness (e.g., a desired depth of the AAO pores 19).

Anodization can be preceded by electropolishing of aluminum deposited over the substrate 14, or electropolishing an aluminum substrate. The electropolishing may involve placing the aluminum in a mixture of perchloric acid and ethanol, where the ratio of respective chemicals is in the range of 1:3 to 1:5 by volume and a purity of the ethanol is in the range of 99%-99.9% and a purity of the perchloric acid is in the range of 69-72%. Subsequently, a voltage potential in a range of approximately ten volts to approximately twenty volts can be applied at a temperature less than 10° Celsius for 3 to 10 minutes depending on a target surface roughness.

The structure 12, and particularly the AAO layer 18, can be used as a light guiding structure. To this extent, an optoelectronic device 20A, 20B can be coupled to the structure 12 using any solution. During operation, the AAO layer 18 can act as a light guiding layer for light propagating to/from the optoelectronic device 20A, 20B. Illustrative optoelectronic devices 20A, 20B include a conventional or super luminescent light emitting diode, a light emitting laser, a laser diode, a light sensor, a photodetector, a photodiode, an avalanche diode, and/or the like. In an embodiment, the optoelectronic device 20A, 20B is configured to operate as an ultraviolet light emitting device. The optoelectronic device 20A, 20B can be coupled to the structure 12 using a coupler 22A, 22B transparent to light of a target wavelength (e.g., the primary wavelength emitted/sensed by the optoelectronic device 20A, 20B).

The coupler 22A, 22B can be configured to position the optoelectronic device 20A, 20B at a target angle with respect to light propagating through the structure 12. In an embodiment, the light propagates through the AAO layer 18 in a direction substantially parallel to a top surface of the AAO layer 18 and the aluminum layer 16. It is understood that the "a direction substantially parallel" means that the average light rays are moving in the direction. It is understood that individual light rays will be traveling in various directions. Regardless, the angle can be selected to provide maximum light guiding of light emitted by the optoelectronic device 20A, 20B. To this extent, the angle can be such that a majority of light emitted by the optoelectronic device 20A, 20B enters the structure 12 at an angle optimal for wave guiding, e.g., at an angle larger than the total internal reflection angle for the structure 12. Similarly, the angle can be selected such that a majority of light propagating through the structure 12 is directed onto a sensing surface of the optoelectronic device 20A, 20B for sensing the light. As illustrated in FIG. 1A, the optoelectronic device 20A can be coupled to a side surface (e.g., top) of the AAO layer 18. Alternatively, as illustrated in FIG. 1B, the optoelectronic device 20B can be coupled to an edge surface of the AAO layer 18. While only a single optoelectronic device 20A, 20B is shown in each of the drawings, it is understood that any number of optoelectronic devices 20A, 20B can be coupled to the structure 12 in any of various possible combinations of locations.

In an embodiment, the coupler 22A, 22B is formed of a fluoropolymer-based material. Illustrative fluoropolymers forming the coupler 22A, 22B include: fluorinated ethylene-propylene (EFEP), fluorinated ethylene propylene (FEP), perfluoroalkoxy (PFA), tetrafluoroethylene hexafluoropropylene vinylidene fluoride (THV), polytetrafluoroethylene (PTFE), polyvinylidene fluoride (PVDF), ethylene-tetrafluoroethylene (ETFE), ethylene chlorotrifluoroethylene (ECTFE), polychlorotrifluoroethene (PCTFE), a copolymer of tetrafluoroethylene and perfluoromethylvinylether (MFA), low density polyethylene (LDPE), perfluoroether (PFA), and/or the like. However, it is understood that the coupler 22A, 22B can be formed from any type of ultraviolet transparent material including, for example, polylactide (PLA), THE, fused silica, sapphire, any combination of two or more ultraviolet transparent materials, and/or the like.

In an embodiment, the coupler 22A, 22B can provide additional functionality. For example, FIG. 2 shows an illustrative light guiding structure 100 according to another embodiment. In this case, an optoelectronic device 20C is embedded in an encapsulating layer 24 formed on the AAO layer 18 of the structure 12. The encapsulating layer 24 can be formed of any material transparent to light of a target wavelength, such as ultraviolet light. To this extent, the encapsulating layer 24 can be formed of a fluoropolymer-based material as described herein. In an embodiment, the AAO layer 18 can include a surface, such as the surface on which the encapsulating layer 24 is located, having a region configured to scatter light propagating there through. In this case, formation of the AAO layer can further include depositing aluminum droplets (islands) over the aluminum layer prior to anodizing the aluminum layer to form the AAO. The subsequent anodization process can anodize both a portion of the original aluminum layer as well as the aluminum droplets located thereon.

It is understood that a light guiding structure described herein can include any of various combinations of layers formed of AAO, a fluoropolymer, a material having a low refractive index (e.g., ambient air), a reflective material, and/or the like. As used herein, a low refractive index material means a material having a refractive index at most ninety percent of the refractive index of the material forming adjacent layer(s) in a structure.

Figure 3A:
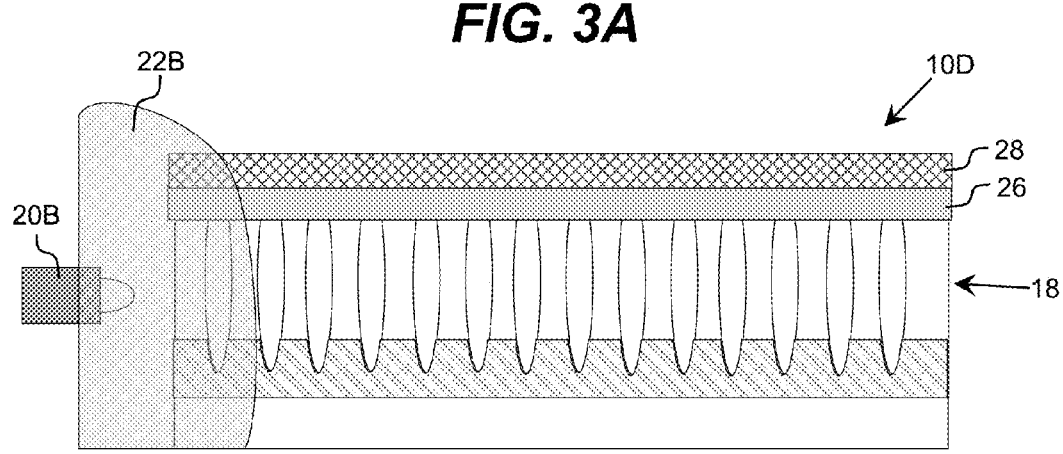
FIGS. 3A and 3B show illustrative light guiding structures according to other embodiments.
Figure 3B:
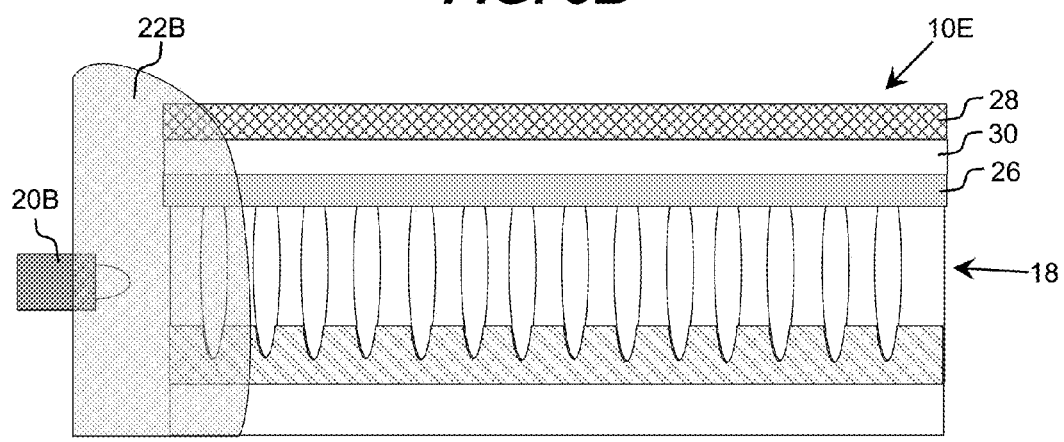

To this extent, FIGS. 3A and 3B show illustrative light guiding structures 10D, 10E, respectively, according to other embodiments. In each light guiding structure 10D, 100, similar to the structure 10B shown in FIG. 1B, an optoelectronic device 20B is mounted to an edge side of the structure 10D, 10E using a coupler 22B. In FIG. 3A, the light guiding structure 10D further includes a transparent film 26 (e.g., a fluoropolymer film) formed on the AAO layer 18 and a reflective film 28 formed on the transparent film 26. The reflective film 28 can be formed of any reflective material, such as polytetrafluoroethylene (e.g., Teflon), aluminum, polished aluminum, and/or the like, and can be uniform or non-uniform. In an embodiment, the reflective film 28 has a reflectivity tailored to a set of desired characteristics of the structure 10D.

In an embodiment, the reflective film 28 has a variable spatial reflectivity. For example, a reflectivity of the reflective film 28 can decrease with distance away from the optoelectronic device 20B. It is understood that the reflective film 28 can be partially transparent and partially reflective, while maintaining constant absorption. The absorption characteristics of the reflective film 28 can be sufficiently small to allow significant light guiding and transmission. For example, as reflectivity of the reflective film 28 decreases, the transmission of the reflective film 28 can increase. Such changes in reflectivity of the reflective film 28 can promote uniform emission of light from an external surface of the reflective film 28. For example, the reflective film 28 can comprise a thin aluminum layer having openings wherein a size and/or density of the openings changes with distance from the optoelectronic device 20B to yield a target overall reflective and transparent properties of the reflective film 28. Alternatively, the reflective film 28 can comprise an alloy of reflective and transparent materials with a varying alloy composition.

The reflectivity of the reflective film 28 can be tailored for a particular application of the light guiding structure 10D. For example, the reflectivity of the reflective film 28 can have a linear profile from highly reflective (near the optoelectronic device 20B) to a highly transparent film throughout a length of the light guiding structure 10D. The reflectivity can range from a highly reflective film to complete transparency. Moreover, a type of reflectivity of the film can be attenuated as well. For example, the reflective film 28 can be specularly reflective in some domains while being diffusively reflective in other domains. Similarly, a transparency of the reflective film 28 can be specular or diffusive and can, in general, vary throughout the reflective film 28 depending on the application needs.

In FIG. 3B, the structure 10E further includes a gap layer 30 located between the transparent film 26 and the reflective film 28. In an embodiment, the gap layer 30 is formed of a transparent fluid. In a more particular embodiment, the fluid is a gas, such as ambient air. The gap layer 30 can be formed using any solution. In an embodiment, the gap layer 30 is formed using a solution described in U.S. Provisional Application No. 62/050,126. In a more particular embodiment, the gap layer 30 includes a support structure, such as a plurality of pillars, which can be formed of a fluoropolymer material. Inclusion of the gap film 30 can provide improved total internal reflection from the interface. The reflective film 28 can provide protection against contamination. In an embodiment, a structure includes a second transparent film as a protective layer instead of the reflective film 28.

An embodiment of a structure described herein can include two or more AAO layers 18. For example, FIGS. 4A-4C illustrate fabrication of an illustrative light guiding structure 10F according to an embodiment. Initially, an interim structure similar to that shown and described in conjunction with FIG. 1B can be obtained (e.g., fabricated). Additionally, a transparent layer 26 can be applied on the AAO layer 18 as described herein. A second AAO layer 32 can be applied to the transparent layer 26 using any solution. For example, the second AAO layer 32 can be formed on an aluminum layer 34 using a process described herein. Subsequently, the structure can be turned to apply the AAO layer 32 to the transparent layer 26. In an embodiment, the transparent layer 26 is formed of a fluoropolymer-based material, which can be heated to enable the AAO layer 32 to fuse with the transparent layer 26.

In an embodiment, one or more conditions used to fabricate the AAO layers 18, 32 can differ. To this extent, the variation can result in pores 33 of the AAO layer 32 having a different size, spacing, and/or the like, from the pores 19 (FIG. 1B) of the AAO layer 18. The differing pores 19, 33 can result in a different averaged index of refraction for the AAO layers 18, 32. Similar to the AAO layer 18, the AAO layer 32 can include an adjacent aluminum layer 34 through which the pores 33 do not extend. In an embodiment, the aluminum layer 34 can be removed using any solution.

For example, the aluminum layer 34 can be chemically removed using a voltage pulse solution. In this case, the aluminum layer 34 can be placed in a mixture of perchloric acid and ethanol, where the ratio of respective chemicals is in the range of 1:3 to 1:5. Subsequently, a voltage pulse from 45 to 50 V can be applied for 3 to 5 seconds, causing the aluminum layer 34 to detach from the AAO layer 32. FIG. 4B shows the resulting structure 10F, and FIG. 4C shows a perspective view of the AAO layer 32. By removing the aluminum layer 34, AAO layers 18, 32 of different types can be stacked in order to create a light guiding structure 10F having any desired number of AAO layers.

It is understood that a solution for fabricating a structure 10F including multiple AAO layers 18, 32 can be implemented using any of various alternative processes. For example, in an embodiment, prior to applying the AAO layer 32 to the structure 10F, a handler layer can be applied to the upper portion of the AAO layer 32 after it is grown on the aluminum layer 34. The handler layer can be relatively thick and formed of a material capable of being attached and detached to the AAO layer 32, e.g., a fluoropolymer such as EFEP. The handler layer can be used to manipulate the AAO layer 32 during a process of detaching the aluminum layer 34 from the AAO layer 32. The AAO layer 32 can be attached to another AAO layer, e.g., by fusing the two layers with a fluoropolymer layer similar to the AAO layers 18, 32 and fluoropolymer layer 26. The handler layer can be removed using any solution, such as, chemical etching, dissolving, and/or the like.

Figure 5:
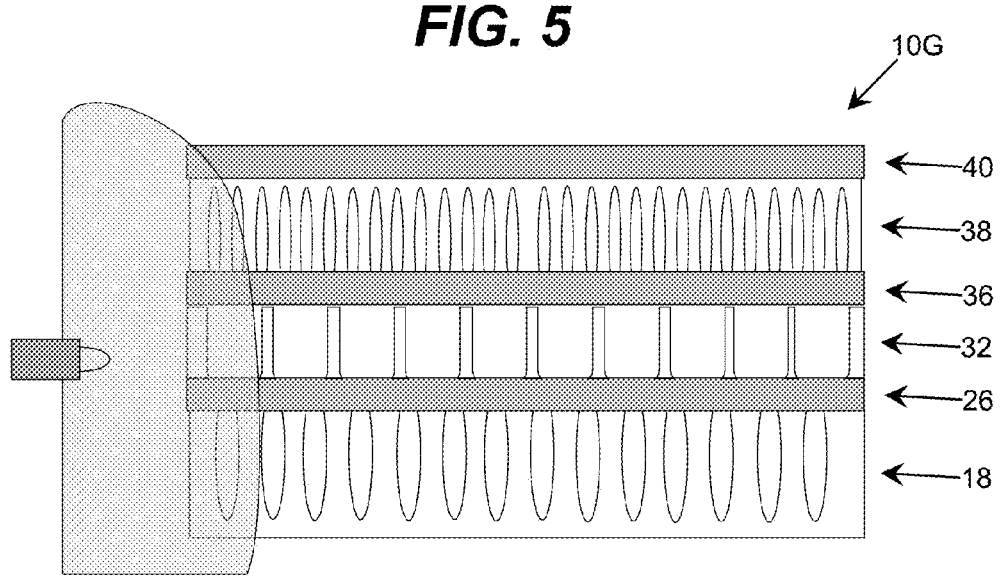
FIG. 5 shows an illustrative light guiding structure according to another embodiment.

Several AAO layers having any combination of attributes can be stacked over each other using this approach. For example, FIG. 5 shows an illustrative light guiding structure 10H according to another embodiment. In this case, the structure 10H includes three AAO layers 18, 32, 38, and three fluoropolymer layers 26, 36, 40. The pore size and spacing of each AAO layer 18, 32, 38 affects the optical properties of the layer (such as transmission, index of refraction, and light scattering). As a result, selection of the properties of the AAO layers 18, 32, 38 can be configured to provide an optimal performance of the light guiding structure 10H for a given target application. In an embodiment, the AAO layers 18, 32, 38 have pore sizes, spacing, thicknesses, and/or the like, which are selected to produce a target graded index of refraction for the structure 10G. In a more particular embodiment, the AAO layer 18 can have pores 19 (FIG. 1B) having diameters in a range of 150 nm to 200 nm and separated by distances (e.g., as measured edge to edge) on the order of 400 nm, the AAO layer 32 can have pores 33 (FIG. 4B) having diameters of approximately 200 nm and separated by distances on the order of 250 nm, and the AAO layer 38 can have pores having diameters of approximately 50 nm and separated by distances slightly larger than 50 nm.

Figure 6A:
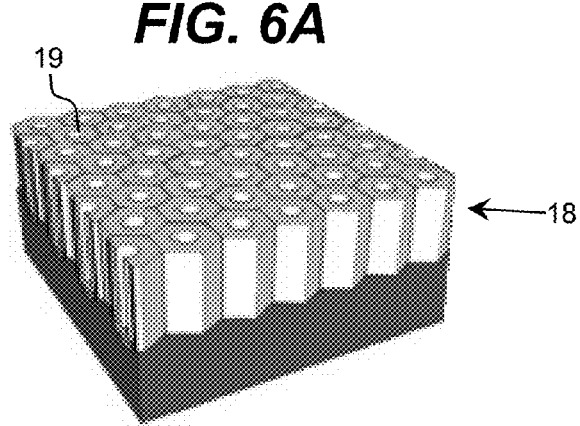
FIGS. 6A-6C show an illustrative process for patterning a fluoropolymer layer according to an embodiment.
Figure 6B:
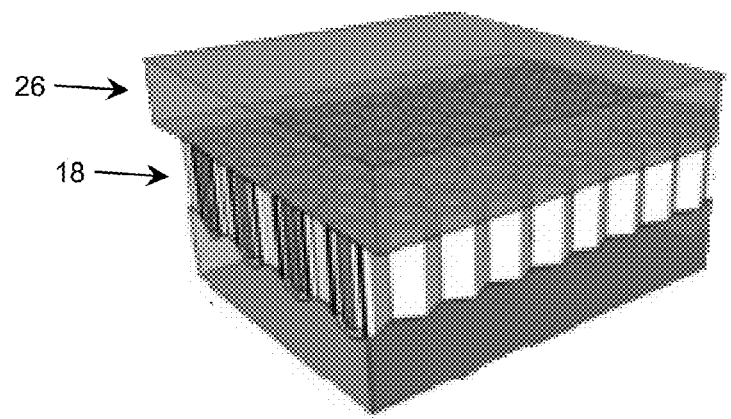
Figure 6C:
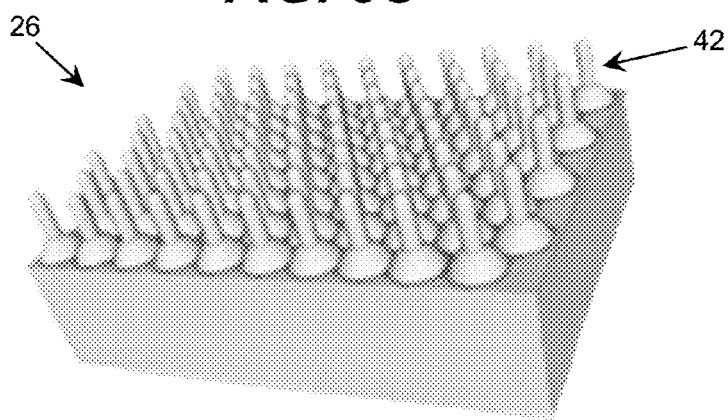

In addition to using an AAO layer as a light guiding and/or diffusive layer in a light guiding structure as described herein, an AAO layer also can be used as a mask layer. For example, an AAO layer can be used to facilitate engineering a fluoropolymer layer having a target patterned surface (e.g., a nano-patterning). To this extent, FIGS. 6A-6C show an illustrative process for patterning a fluoropolymer layer 26 according to an embodiment. As shown in FIG. 6A, a structure including an AAO layer 18 having exposed pores 19 can be obtained (e.g., fabricated) using any solution. As shown in FIG. 6B, a fluoropolymer layer 26 can be formed directly on the AAO layer 18 and allowed to flow (e.g., by heating) such that the fluoropolymer penetrates the pores 19 in the AAO layer 18. As shown in FIG. 6C, the AAO layer 18 and the fluoropolymer layer 26 can be detached using any solution, such as mechanical lift-off, AAO etching, and/or the like, which will result in the fluoropolymer layer 26 having the patterned surface 42.

Figure 7A:
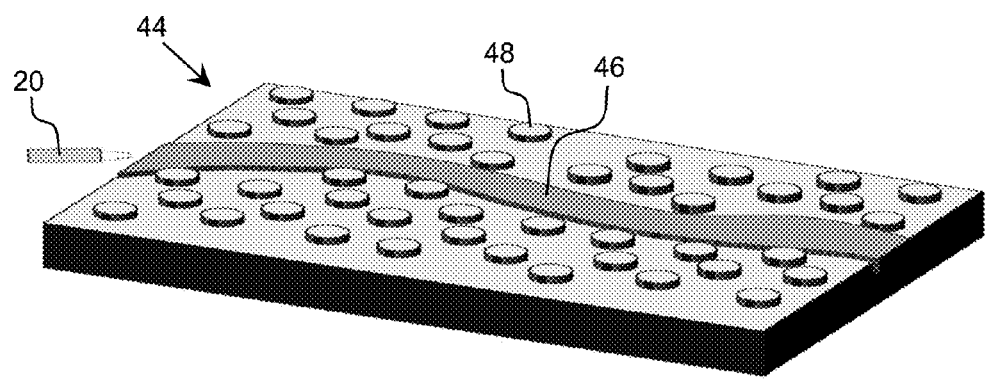
FIGS. 7A and 7B show illustrative utilizations of surface-patterned fluoropolymer layers in a light guiding structure according to embodiments.
Figure 7B:
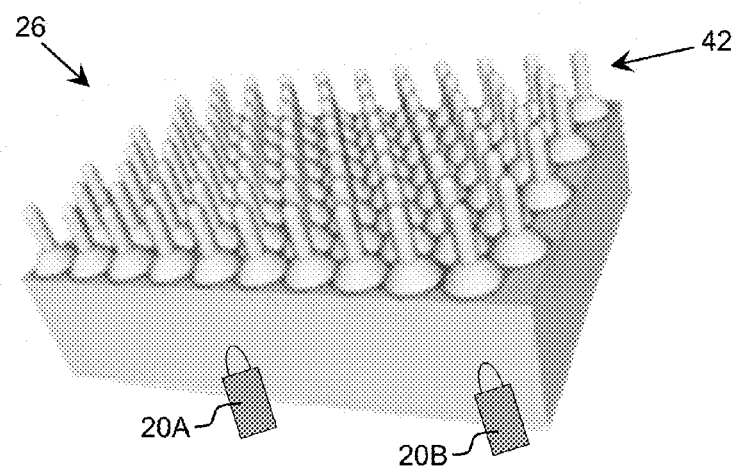

The surface patterning 42, such as a nano-scale surface patterning, can be configured to result in formation of a photonic crystal within the fluoropolymer layer 26, which can provide effective reflection and/or wave guiding of light. To this extent, FIGS. 7A and 7B show illustrative utilizations of surface-patterned fluoropolymer layers in a light guiding structure according to embodiments. In FIG. 7A, light emitted from a light source 20 can propagate along a light guiding region 46 of a fluoropolymer layer 44. The light guiding region 46 is surrounded by a photonic crystal formed by nano-scale pillars 48 formed on the surface of the fluoropolymer layer 44 as described herein. In FIG. 7B, the fluoropolymer layer 26 including a patterned surface 42 as shown in FIG. 6C is used to provide diffused scattering of light emitted by optoelectronic devices 20A, 20B, located on an opposing surface of the fluoropolymer layer 26 as the patterned surface 42.

While shown and described in conjunction with fluoropolymer materials, it is understood that a similar process can be utilized with other materials, such as fused silica, and/or the like. In another embodiment, a glass layer including an array of holes can be deposited over a fluoropolymer layer located on the AAO layer. A second fluoropolymer layer can be deposited over the glass layer and allowed to flow so that the fluoropolymer penetrates the holes in the glass layer. Subsequently, the glass layer can be removed, e.g., by etching.

Figure 8A:
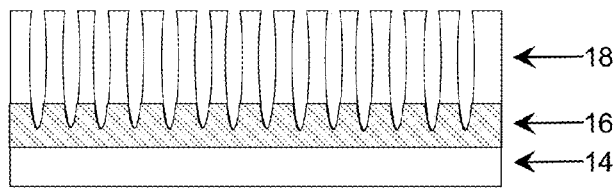
FIGS. 8A-8F show an illustrative process for forming a light guiding structure according to an embodiment.
Figure 8B:
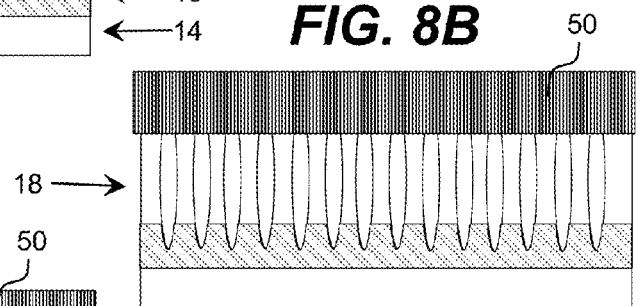

FIGS. 8A-8F show an illustrative process for forming a light guiding structure according to an embodiment. As shown in FIG. 8A, an AAO layer 18 can be obtained using any solution, e.g., fabricated as described herein. In FIG. 8B, a handler layer 50 can be applied to a top surface of the AAO layer 18 using any solution. For example, as described herein, the handler layer 50 can be formed of a fluoropolymer, which is allowed to flow sufficiently to enable the AAO layer 18 to be secured thereto. In an embodiment, the handler layer 50 is formed of a transparent material (e.g., ultraviolet transparent material), such as the fluoropolymer, and is utilized within a resulting light guiding structure. Alternatively, the handler layer 50 can be removed, and not included in the light guiding structure.

Figure 8C:
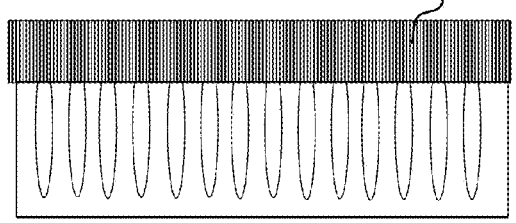
Figure 8D:
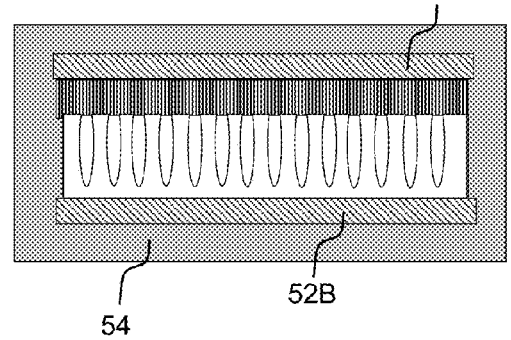

In FIG. 8C, the substrate 14 and aluminum layer 16 shown in FIG. 8A are removed from the opposing surface of the AAO layer 18 using any solution. For example, the substrate 14 and aluminum layer 16 can be removed using a voltage pulse process described herein. In FIG. 8D, a layer of filler material 52A, 52B can be applied (e.g., deposited, placed, and/or the like) to the top and/or bottom surfaces of the structure shown in FIG. 8C. For example, the filler material 52A can be applied on the handler layer 50, while the filler material 52B can be applied to the opposing surface of the AAO layer 18. Additionally, the entire structure can be encapsulated with a fluoropolymer encapsulant 54 using any solution. The filler material 52B can comprise any material that can be removed (e.g., etched) from the fluoropolymer encapsulant 54 using a process that does not damage the fluoropolymer encapsulant 54, such as, for example, silicon dioxide.

Figure 8E:
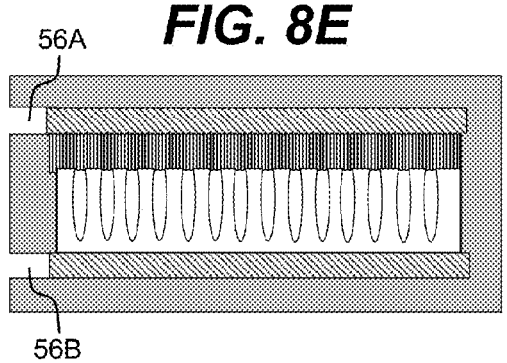

In FIG. 8E, openings 56A, 56B are formed in the fluoropolymer encapsulant 54 to expose the filler material 52A, 52B to the ambient. The openings 56A, 56B can be formed using any solution, such as mechanical removal of the fluoropolymer encapsulant using a drill, puncture, and/or the like, localized heating and/or chemical removal, etc. While the openings 56A, 56B are shown located on a side of the structure, it is understood that an opening 56A, 56B can be located in any desired location. Furthermore, it is understood that an opening 56A, 56B can have any dimension. While a single opening 56A, 56B for each layer of filler material 52A, 52B is shown and described herein, it is understood that embodiments can use more than one opening 56A, 56B for a layer of filler material 52A, 52B.

Figure 8F:
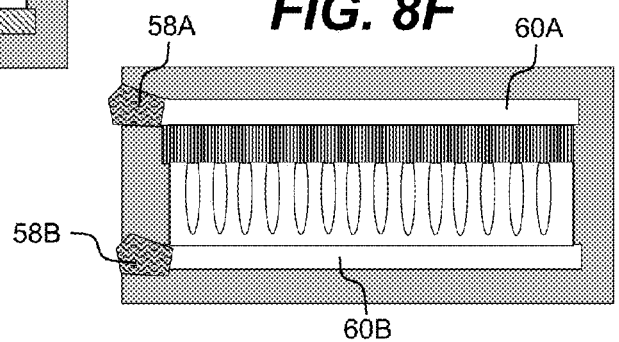

As shown in FIG. 8F, the filler material 52A, 52B (FIG. 8D) can be removed from the fluoropolymer encapsulant 54 using any solution. For example, the filler material 52A, 52B can be removed using a chemical etching approach. In this case, the structure can be placed in a bath of a chemical that reacts with (e.g., dissolves) the filler material 52A, 52B, but preserves the fluoropolymer encapsulant 54. The chemical can pass through the openings 56A, 56B (FIG. 8E) and react with and etch the filler material 52A, 52B. For example, when the filler material 52A, 52B is silicon dioxide, the chemical can be hydro-fluoric acid. However, it is understood that this is only illustrative of various chemicals and filler material 52A, 52B that can be utilized. However, it is understood that any material that can be readily applied and dissolved, such as silicon nitride, and/or the like, can be utilized as the filler material 52A, 52B.

Subsequently, the openings 56A, 56B (FIG. 8E) can be sealed using any solution. In an embodiment, the openings 56A, 56B are sealed using a sealing material 58A, 58B. The sealing material 58A, 58B can be any material that can effectively bind to the fluoropolymer encapsulant 54 and is sufficiently stable over a target time period, such as a suitable type of epoxy. In an embodiment, the sealing material 58A, 58B is a fluoropolymer-based material, which is placed over the opening and heated to bind with the fluoropolymer encapsulant 54. However, it is understood that this is only illustrative, and other approaches, such as the use of a mechanical sealant, and/or the like, can be utilized. As illustrated, the process results in two layers 60A, 60B filled with a fluid, such as ambient air. In an embodiment, the process can further include filling one or more of the layers with a liquid, such as purified water as defined by the U.S. Food and Drug Administration, prior to sealing the corresponding opening 58A, 58B.

Embodiments further provide for the inclusion of one or more optical elements in the light guiding structure. As used herein, an optical element is a structure configured to extract, emit, sense, redirect, scatter, diffuse, focus, and/or the like, radiation propagating within or outside the light guiding structure. For example, one or more regions of a surface of a fluoropolymer layer described herein can include roughness elements for providing a diffusive output surface, which can be created using standard imprinting technology. Additionally, one or more lenses (e.g., Fresnel lenses), and/or the like, can be included on a surface of a fluoropolymer layer described herein. To this extent, a lens, such as a Fresnel lens, can be imprinted onto the surface, a lens can be deposited over and embedded into the surface (e.g., by flowing the fluoropolymer), and/or the like. Such a lens can be fabricated from any transparent material including sapphire, fused silica, a fluoropolymer, and/or the like.

While shown and described herein as a method of fabricating a structure including a light guiding structure, it is understood that aspects of the invention further provide various alternative embodiments. For example, embodiments of the invention further include the various structures shown and described herein. Additionally, embodiments of the invention include systems, such as ultraviolet-based sterilization systems, which incorporate a structure described herein, as well as the fabrication of such systems. To this extent, the fabrication of such a system can include integrating a structure described herein as well as connecting one or more of the electronic devices described herein to a control system capable of providing power to and operating the electronic device in a desired manner. Such integration and connections can be performed using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A structure including:
a first anodized aluminum oxide (AAO) layer;
a second AAO layer located on the first AAO layer; and
an optoelectronic device coupled to a side of at least one of: the first AAO layer or the second AAO layer, wherein the optoelectronic device is positioned at a target angle with respect to light propagating through the at least one of: the first AAO layer or the second AAO layer, wherein the first and second AAO layers have distinct optical properties.

2. The structure of claim 1, further comprising a coupler coupling the optoelectronic device to the side of the at least one of: the first AAO layer or the second AAO layer, wherein the coupler is formed of a transparent material.

3. The structure of claim 2, wherein the coupler is formed of a fluoropolymer.

4. The structure of claim 1, wherein the optoelectronic device is coupled to an edge of the at least one of: the first AAO layer or the second AAO layer.

5. The structure of claim 1, wherein the optoelectronic device is an ultraviolet light emitting device and the target angle provides maximum light guiding of the ultraviolet light emitted by the ultraviolet light emitting device.

6. The structure of claim 1, further comprising a fluoropolymer layer located between the first AAO layer and the second AAO layer.

7. The structure of claim 1, further comprising:
a fluoropolymer layer located adjacent to one of: the first AAO layer or the second AAO layer; and
a reflective layer located adjacent to a surface of the fluoropolymer layer opposite the one of: the first AAO layer or the second AAO layer.

8. The structure of claim 7, further comprising a gap layer located between the reflective layer and the fluoropolymer layer, wherein the gap layer comprises a transparent fluid.

9. The structure of claim 1, wherein the first and second AAO layers provide a graded index of refraction.

10. A light guiding structure comprising:
a plurality of anodized aluminum oxide (AAO) layers; and
a plurality of fluoropolymer layers alternating with the plurality of AAO layers, wherein light propagates through the light guiding structure in a direction substantially parallel to the layers, and wherein the plurality of AAO layers have a plurality of distinct optical properties.

11. The structure of claim 10, further comprising a reflective layer located adjacent to a surface of at least one of the plurality of fluoropolymer layers.

12. The structure of claim 11, further comprising a gap layer located between the reflective layer and the at least one of the plurality of fluoropolymer layers, wherein the gap layer comprises a transparent fluid.

13. The structure of claim 10, wherein the plurality of AAO layers provide a graded index of refraction.

14. The structure of claim 10, further comprising:
an optoelectronic device coupled to an edge of the light guiding structure, wherein the optoelectronic device is positioned at a target angle with respect to the light propagating through the light guiding structure; and
a coupler coupling the optoelectronic device to the side of the light guiding structure, wherein the coupler is formed of a transparent material.

15. A method comprising:
fabricating a structure including:
a first anodized aluminum oxide (AAO) layer; and
a fluoropolymer layer located immediately adjacent to a surface of the first AAO layer, wherein light propagates through the first AAO layer in a direction substantially parallel to the fluoropolymer layer; and
patterning a surface of the fluoropolymer layer opposite the first AAO layer using a second AAO layer.

16. The method of claim 15, further comprising coupling an optoelectronic device to a side of the first AAO layer using a transparent material, wherein the optoelectronic device is positioned at a target angle with respect to the light propagating through the first AAO layer.

17. The method of claim 15, further comprising applying a reflective layer over a surface of the fluoropolymer layer opposite the first AAO layer.

18. The method of claim 15, further comprising fabricating a gap layer immediately adjacent to a surface of the fluoropolymer layer opposite the first AAO layer.

19. The method of claim 15, further comprising forming a third AAO layer immediately adjacent to a surface of the fluoropolymer layer opposite the first AAO layer.

20. The method of claim 15, wherein the patterning forms a photonic crystal in the fluoropolymer layer.

* * * * *